United States Patent
Yamada et al.

(10) Patent No.: US 6,516,058 B1
(45) Date of Patent: Feb. 4, 2003

(54) VOICE NETWORK ACCESS SYSTEM

(75) Inventors: Nobuo Yamada, Tokyo (JP); Kunio Iimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/210,365

(22) Filed: Dec. 14, 1998

(30) Foreign Application Priority Data

Dec. 12, 1997 (JP) .............................................. 9-342481

(51) Int. Cl.[7] .......................... H04M 1/66; H04M 3/00; H04M 7/00
(52) U.S. Cl. ................... 379/198; 379/220.01; 379/225; 379/229; 379/231; 379/234; 379/901; 379/903
(58) Field of Search ................................. 379/188, 196, 379/197, 198, 219, 220.01, 225, 229, 231, 232, 234, 901, 903

(56) References Cited

U.S. PATENT DOCUMENTS

| | | | |
|---|---|---|---|
| 4,747,124 A | * 5/1988 | Ladd | ....................... 379/198 X |
| 5,455,855 A | 10/1995 | Hokari | ......................... 379/229 |

FOREIGN PATENT DOCUMENTS

| | | | |
|---|---|---|---|
| JP | 62-168440 | 7/1987 | ............. H04L/9/00 |
| JP | 2-118752 | 5/1990 | ............. H04L/9/32 |
| JP | 6-133030 | 5/1994 | ............. H04M/3/00 |
| JP | 6-197348 | 7/1994 | ............. H04M/9/00 |
| JP | 6-66832 | 8/1994 | ............. H04M/3/42 |
| JP | 6-245240 | 9/1994 | ............. H04M/3/58 |
| JP | 7-154481 | 6/1995 | ............. H04M/3/42 |
| JP | 8-137969 | 5/1996 | ............. G06F/19/00 |
| JP | 9-271051 | 10/1997 | ............. H04Q/3/58 |

* cited by examiner

Primary Examiner—Harry S. Hong
(74) Attorney, Agent, or Firm—Foley & Lardner

(57) ABSTRACT

An authentication system is applied for a voice network in order to provide the same security as that attained by a data network. Provided is a voice network access system wherein a one-time password system, which is used as an access authentication system, is applied for a voice network that is constituted by an private automatic branch exchange that includes an external interface; wherein the private automatic branch exchange is connected to a computer telephony server across the external interface for the exchange of sender number information that is received from a public network; and wherein the private automatic branch exchange is also connected via the external interface to an authentication system server, which receives a user's name from the computer telephony server and performs a personal authentication process using the user's name.

10 Claims, 5 Drawing Sheets

VOICE NETWORK ACCESS SYSTEM

BACKGROUND OF THE INVENTION

1. Field of the Invention

The present invention relates to a voice network access system wherein a one-time password system, used as an access authentication system, is applied to a voice network consisting of an private automatic branch exchange.

2. Related Arts

As a conventional system, a service start permission, flag exchange method using a public communication line is described in Japanese Unexamined Patent Publication No. Sho 62-168440. According to this method, a service start permission ID is transmitted not only unidirectionally, from a terminal to a host, along a public communication network, but is also exchanged interactively, so that more precisely specified and important terminal information, such as monetary information, can be exchanged via the public communication line.

According to a computer remote control method described in Japanese Unexamined Patent Publication No. Hei 2-118752, an authorized user can operate a computer in a conventional manner, however, should that authorized user attempt to access a computer by using the registered name and the code number of another user, so long as the subscriber number for the communication line that is used is not that of the user whose name and code number have been appropriated, the authorized user will be inhibited from operating the subject computer.

Further, according to a sub-address dial-in control method described in Japanese Unexamined Patent Publication No. Hei 6-197384, upon receiving a call setup message from a calling terminal device, security code added at the head of a received sub-address is employed to search a table in which the security code and corresponding data conversion algorithms are entered, and the data conversion algorithm that is extracted is executed. As a result, a communication service maintaining a high level of secrecy can be provided only to those senders who have been issued the appropriate security code.

An private automatic branch exchange described in Japanese Unexamined Patent Publication No. Hei 9-271051 effectively prevents a third party from illegally using the network of an institution, and improves the exchange service function. That is, based on specific information that concerns a sender, or that is input by a sender, a predetermined security check is performed by the switchboard, which includes a security processor for determining whether permission for the connection of a call should be granted.

In addition, according to a sub-address dial-in control method described in Japanese Examined Patent Publication No. Hei 6-066832, a table is provided in which are entered security codes and corresponding service regulation classes, and a regulation class is identified by searching the table using a security code that is added to the head of a sub-address received as part of a call setup message. The service for a class that corresponds to the security code is provided only to a sender who has been issued the appropriate security code, while for all other senders provision of the service is inhibited.

In the above described conventional system, a security system for a data network and a security system constituted by an private automatic branch exchange are provided separately. Therefore, to access such a system from outside an office, in accordance with the access destination that is desired, different passwords must be employed. As a result, a user must memorize two passwords and a manager must manage the data for the two systems.

In addition, since the security systems are provided separately, the granting of authorization to a user can not be governed by a verification process involving the use of either data, or voice.

Furthermore, although the opportunities for external voice accesses have increased as more and more users have come to employ portable telephones and PHSes, for maintaining security almost no countermeasures are available that depend on the use of voice.

SUMMARY OF THE INVENTION

It is, therefore, one objective of the present invention to provide a voice network access system that applies for a voice network an authentication system that provides the same security as that afforded by a data network.

To achieve the above objective, according to one aspect of the present invention, provided is a voice network access system wherein, to provide the same security as that afforded by a data network, a one-time password system, which is used as an access authentication system, is applied for a voice network that is constituted by an private automatic branch exchange; and wherein the specifications for the private automatic branch exchange are that the exchange of sender number information that is received across a public network is enabled, and that the private automatic branch exchange includes an external interface and a computer telephony server that is connected via the external interface.

It is preferable that the external interface be an interface for a local area network.

In addition, it is preferable that the private automatic branch exchange further include a voice response device connected by a line circuit.

Furthermore, it is preferable that the private automatic branch exchange call the voice response device upon receiving a call from a public network switchboard subscriber, while at the same time transmitting the sender number information to the computer telephony server.

Further, it is preferable that upon receiving the sender number information the computer telephony server obtain a pertinent user name by searching a conversion table for sender number information and users' names, which are prepared in advance in the computer telephony server.

It is preferable that the voice network access system further comprise an authentication system server that, to perform a personal authentication process, is connected to the external interface to receive a user's name from the computer telephony server.

Also, it is preferable that the authentication system server instruct the voice response device to send a response, and that the voice response device form a loop for the line circuit.

Further, it is preferable that the voice response device prepare a numerical reception circuit, that the voice response device receive a password dialed in by the public network subscriber and transmit the password to the authentication system server, and that the authentication system server examine the password and return the result to the voice response device.

In addition, it is preferable that the voice response device use tones or a display to relay to the public network subscriber the result provided by the examination of the password, and that the public network subscriber be granted access to the private automatic branch exchange to the extent that is authorized when, as a result of the examination, the password has been verified.

It is also preferable that the authentication system server employ a power authentication function and a log function; that the authentication system server, by using the power authentication function, be capable of flexibly assigning, for each user, the function of the private automatic branch exchange and other resources; and that the authentication system server, by using the log function, be capable of quickly detecting a user who has illegally accessed a system and of observing traffic According to another aspect of the present invention, provided is a voice network access system wherein a onetime password system, which is used for an access authentication system, is applied for a voice network, which is constituted by an private automatic branch exchange, in order to provide the same security as that which is afforded by a data network; and wherein for the private automatic branch exchange are included a specification that provides for the exchange of sender number information that is received across a public network, and an external interface and a voice response device that are connected via the external interface and to which a function of a computer telephony server is assigned.

With this arrangement, since the authentication system is applied to a voice network, the same security can be provided as that which is attained with a data network.

DETAILED DESCRIPTION OF THE PREFERRED EMBODIMENT

Figure 1:
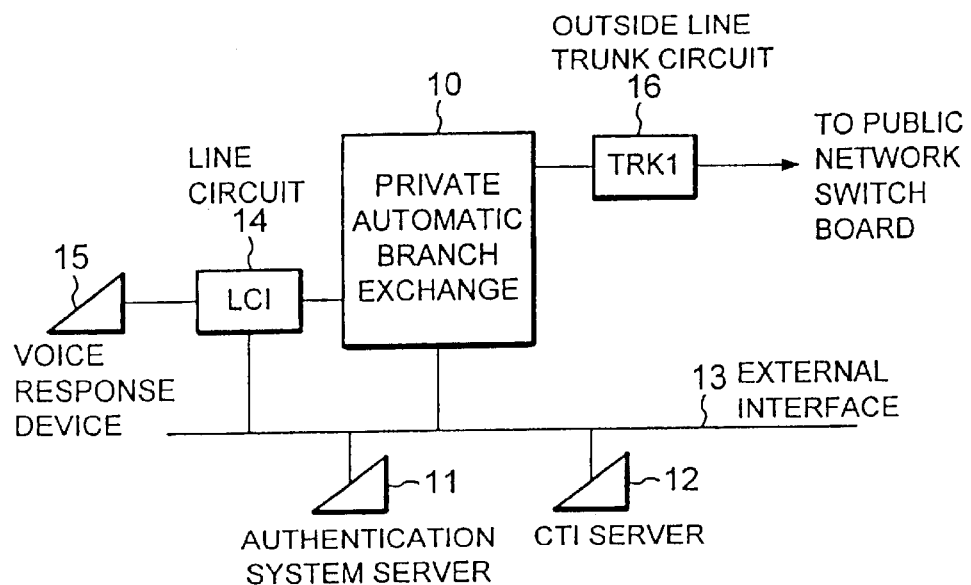
FIG. 1 is a block diagram illustrating the general arrangement of a voice network access system for the present invention.

The preferred embodiment of the present invention will now be described in detail while referring to the drawings.

FIG. 1 is a diagram illustrating the general arrangement of a voice network access system according to the present invention. In this system, as viewed from an private automatic branch exchange 10, an outside line trunk circuit 16 is connected to a switching center line, i.e., a subscriber line for a public network switchboard. The private automatic branch exchange 10 includes an external interface 13, and is connected, across a local area network (hereinafter referred to as a LAN), such as an ethernet, to a computer telephony server (hereinafter referred to as a CTI server) 12 via the external interface 13 to facilitate the exchange of sender number information (hereinafter referred to as a sender ID) received across a public network. Upon receiving a call from a public network switchboard subscriber, the private automatic branch exchange 10 calls a voice response device 15 that is connected to a line circuit 14, and at the same time, transmits the sender ID to the CTI server 12. Upon receiving the sender ID, the CTI server 12 conducts a search of a conversion table for sender IDs and users' names, which is internally prepared, in advance, and obtains and transmits a pertinent user's name to an authentication system server 11 that is connected to the external interface 13. When the user's name is received, the authentication system server 11 performs a personal verification, and instructs the voice response device 15 to send a response, while the voice response device 15 forms a loop for the line circuit 14 (which is set to the response state). Then, the voice response device 15 prepares a numerical reception circuit to receive a password that is dialed in by the public network subscriber. Thereafter, the voice response device 15 transits the received password to the authentication system server 11, which examines the password and supplies the results to the voice response device 15. Upon receiving the results of the examination, the voice response device 15 communicates them by using tones or a display. When the password has been verified, to the extent authorized, access to the private automatic branch exchange 10 is granted the public network subscriber.

According to the thus arranged voice network access system of the present invention, the authentication system is applied for a voice network, so that the same security can be provided as that attained by a data network.

Figure 2:
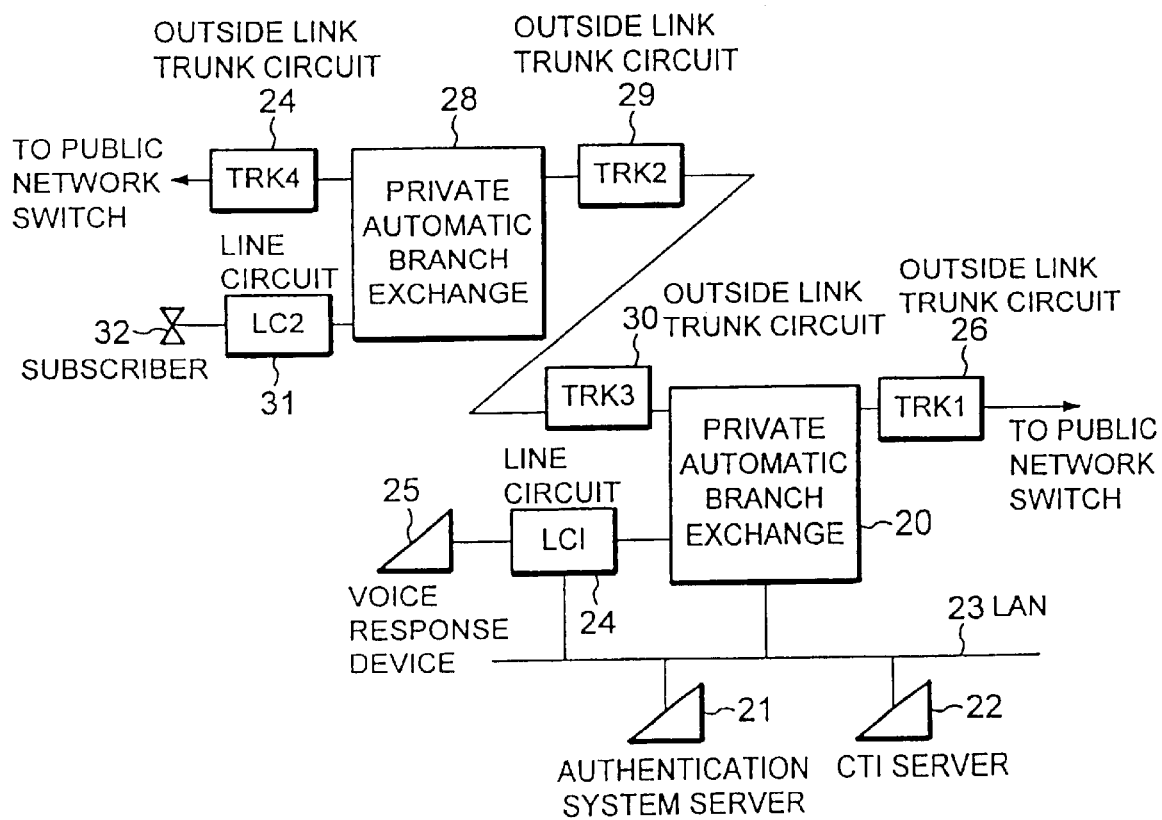
FIG. 2 is a block diagram illustrating the arrangement of a voice network access system according to one embodiment of the present invention.

FIG. 2 is a block diagram illustrating the arrangement of a voice network access system according to one embodiment of the present invention. This system comprises an private automatic branch exchange 20, an authentication system server 21, a CTI server 22, a LAN 23, a line circuit 24, a voice response device 25, outside line trunk circuits 26 and 27, which are connected to subscriber lines for a public network switchboard (not shown), an opposed private automatic branch exchange 28 that constitutes a voice network, outer trunk lines 29 and 30 that connect the private automatic branch exchanges 20 and 28, and a line circuit 31. The private automatic branch exchange 20 is interfaced with an external computer (the CTI server 22 in this embodiment) so as to interact with the CTI server 22 that communicates with the LAN 23.

Figure 3:
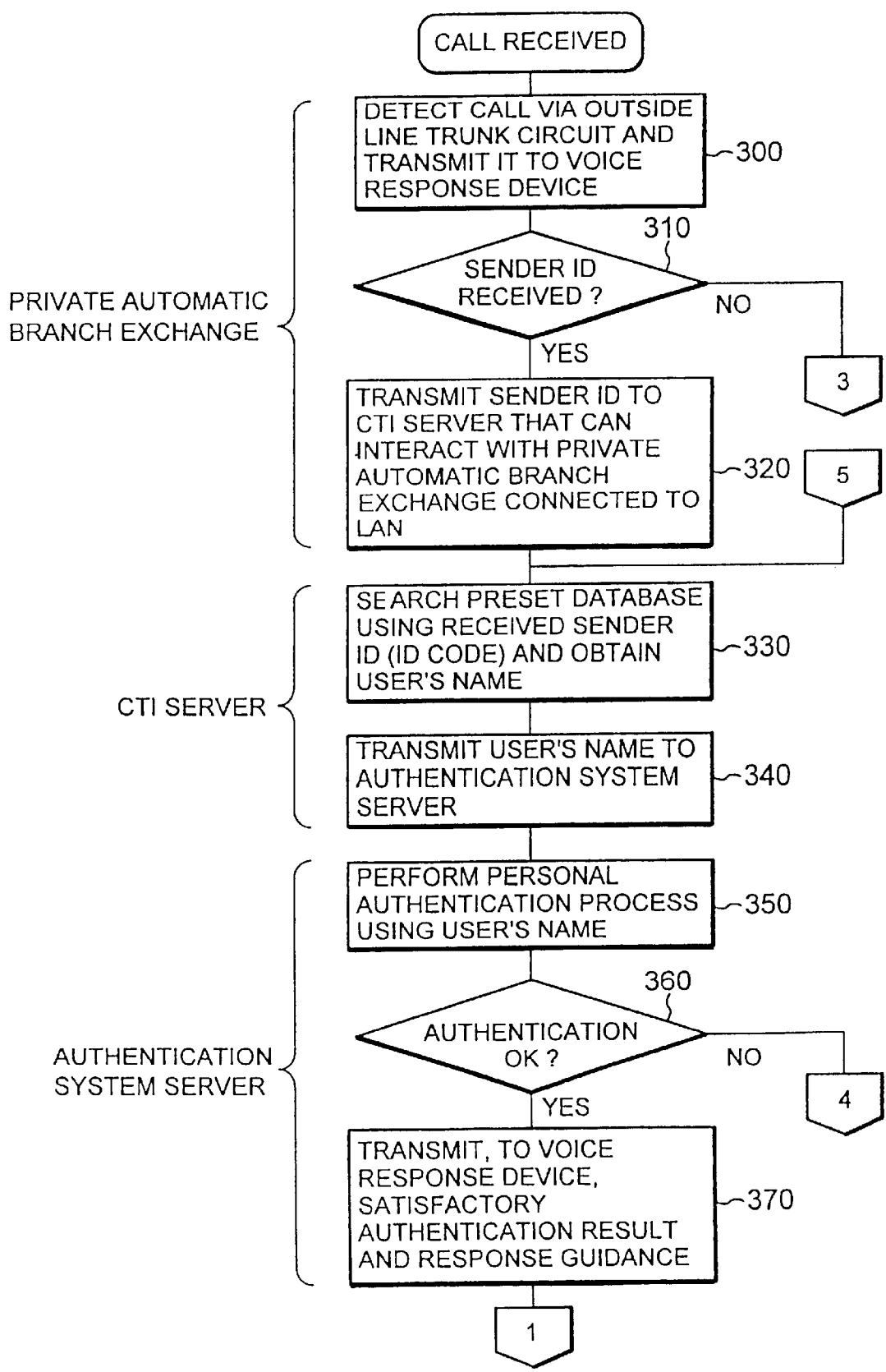
FIG. 3 is a flowchart showing the processing performed for the embodiment of the present invention.
Figure 4:
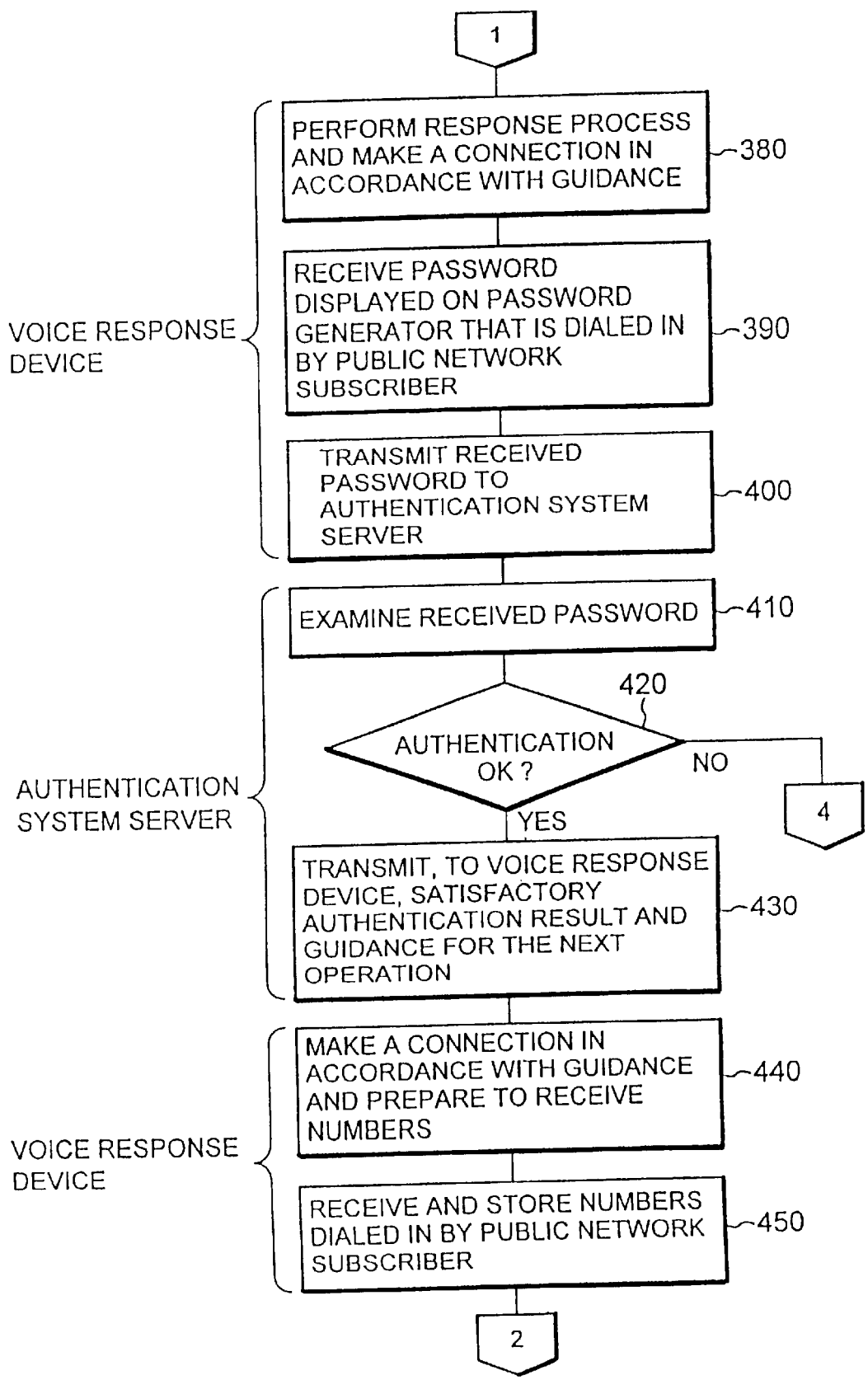
FIG. 4 is a flowchart showing the processing performed for the embodiment of the present invention.
Figure 5:
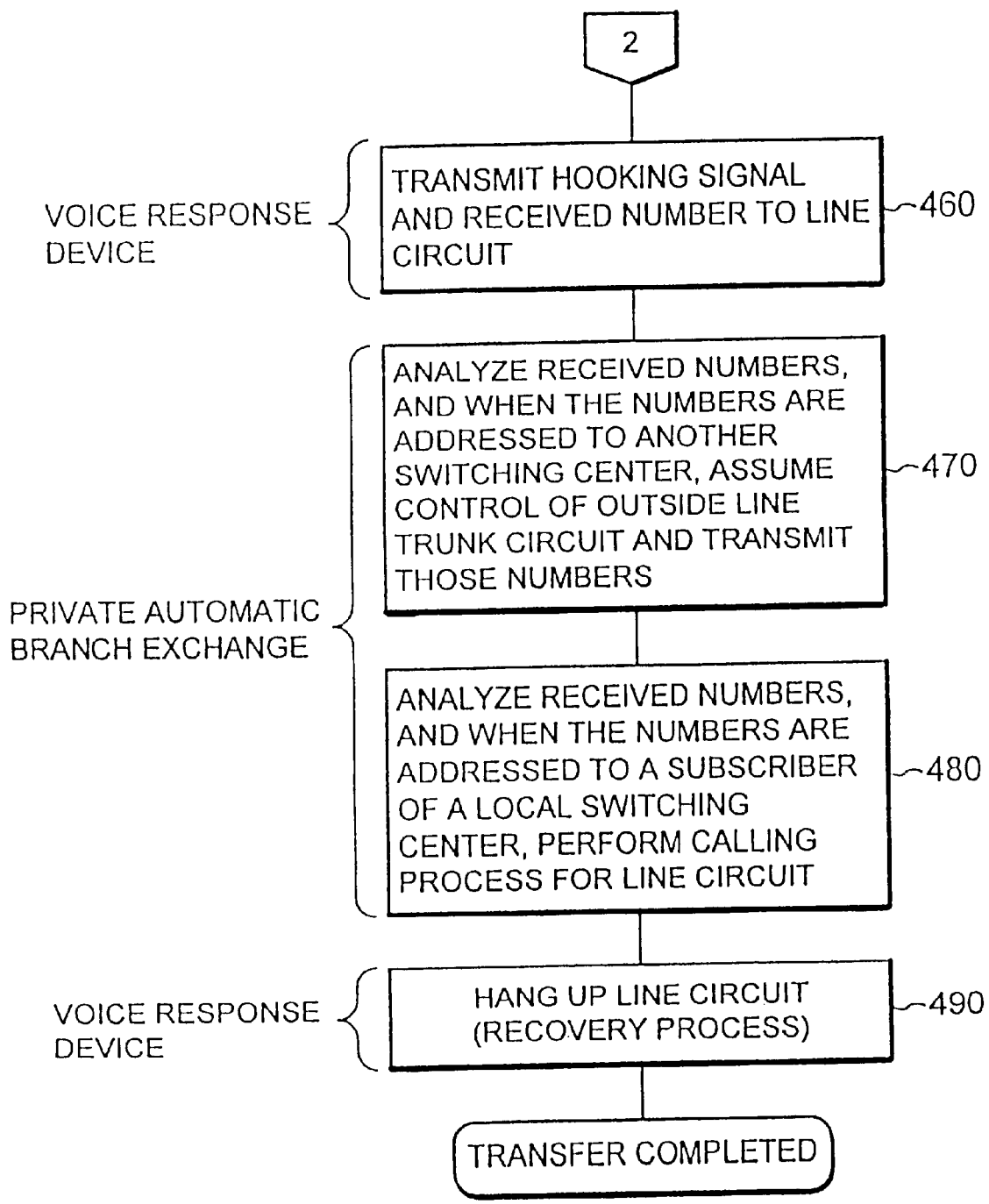
FIG. 5 is a flowchart showing the processing performed for the embodiment of the present invention.

FIGS. 3 to 5 are flowcharts showing the processing performed by the voice network access system according to the embodiment of the present invention.

First, in FIG. 3, the private automatic branch exchange 20 detects the transmission across the outside line trunk circuit 26 of a call from a subscriber that is accommodated by a public network switchboard (300). The private automatic branch exchange 20 then determines whether sender number information (sender ID) has been received (310), and when a sender ID has been received, it is transmitted to the CTI server 22, which is connected to the LAN 23 and can interact with the private automatic branch exchange 20 (320). The CTI server 22 employs the received sender ID (ID code) to search a database that has been prepared in advance, and obtains a user's name (330). Then, the CTI server 22 transmits the user's name to the authentication system server 21 (340), whereafter the authentication system server 21 uses the received user's name to perform a personal authentication process (350). When as a result of the authentication process the user's name is verified, the authentication system server 21 transmits the results and response guidance to the voice response device 25 (370).

In FIG. 4, the voice response device 25 exercises loop control for the line circuit 24, and performs the response process and transmits response guidance (380). Upon receiving the response guidance, by dialing, the public network subscriber enters a password that is displayed on a password generator (390), after which the voice response device 25 transmits the received password to the authentication system server 21 (400). The authentication system server 21 examines the received password (410) and performs an authentication process (420). When the password has been verified, the authentication system server 21 transmits the results and execution guidance for the next operation to the voice response device 25 (430). The voice response device 25 makes a connection in accordance with the guidance and prepares to receive numbers that are dialed in (440). Then, the numbers that are dialed in by the public network subscriber are received and stored in an internal memory (450).

In FIG. 5, when reception of the call has been completed, a signal to hang up is transmitted to the line circuit 24 and the numbers stored in the memory are transmitted to the private automatic branch exchange 20 (460). The private automatic branch exchange 20 analyzes the received numbers, and when the numbers are those for addressing another switching center, control of the outside line trunk circuit 29 is assumed to transmit the numbers (470). The private automatic branch exchange 28 then analyzes the numbers received from the outside line trunk circuit 29, and when the numbers are addressed for a subscriber 32 serviced by the exchange 28, the private automatic branch exchange 28 calls the line circuit 31. When the received numbers are addressed for a public network subscriber, control of the outside line trunk circuit 27 is assumed to transmit the public network number (480). Thereafter, the voice response device 25 hangs up the line circuit 24 and performs a recovery process (490).

Figure 6:
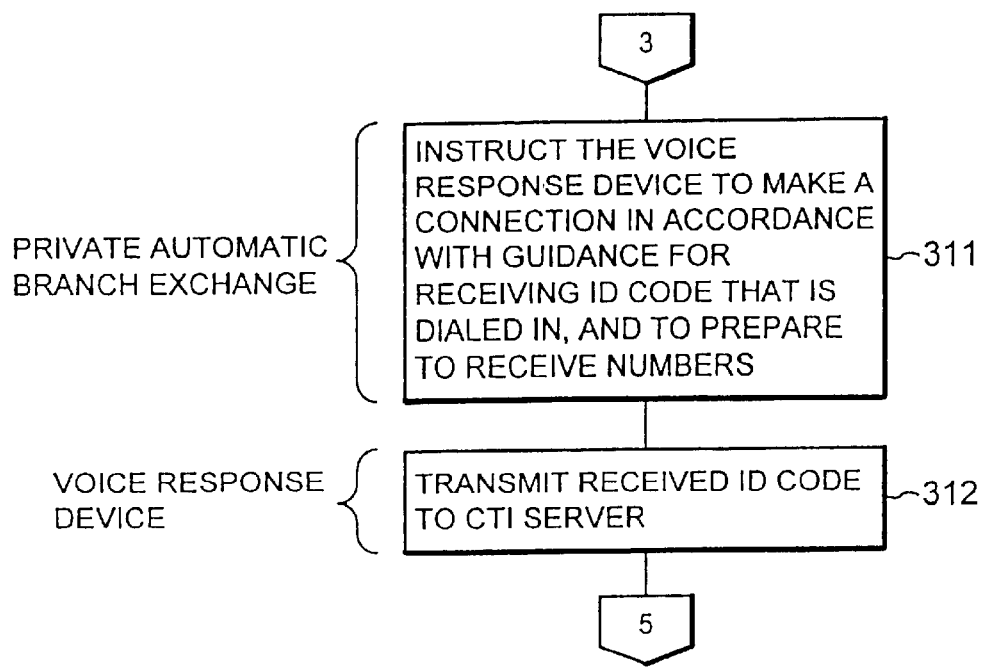
FIG. 6 is a flowchart showing the processing performed for the embodiment of the present invention.

In FIG. 6, when at 310 in FIG. 3 a result is obtained to the effect that a sender ID has not been received, the private automatic branch exchange 20 transmits to the voice response device 25 guidance for making a connection for receiving an ID code that is dialed in, and to prepare to receive the numbers that are dialed in (311). The voice response device 25 thereafter transmits the ID code it receives to the CTI server 22 (312), and the process at 330 and the following processes in FIG. 3 are performed.

Figure 7:
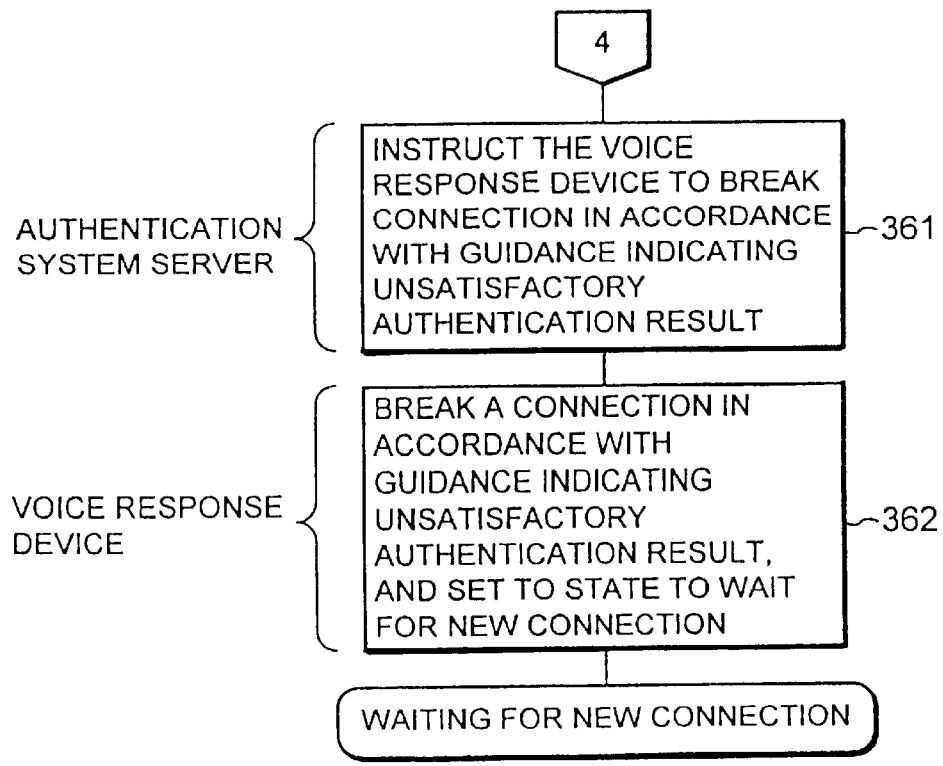
FIG. 7 is a flowchart showing the processing performed for the embodiment of the present invention.

In FIG. 7, when the result of the authentication process at 360 in FIG. 3 or at 420 in FIG. 4 is not satisfactory, the authentication system server 21 transmits to the voice response device 25 connection guidance indicating that the authentication results were not satisfactory (361). In accordance with the guidance indicating that the authentication result was not satisfactory, the voice response device 25 breaks the connection and is then shifted to a state wherein it waits for the public network subscriber to make a new connection (362).

In the above embodiment, in addition to the authentication system server 21 a CTI server 22 and a voice response device 25 are required that can interact with the computer. However, so long as the voice response device 25 can be connected to the LAN 23, only the voice response device 25 need be employed if it is assigned a part of the function of the CTI server 22. In this case, the investment required for new equipment can be eliminated.

Furthermore, in the above embodiment a personal authentication function and a password authentication function by the authentication system are employed, but in addition to these functions, a power authorization function and a log function (account) may be employed. When the power authorization function is employed, the function of the private automatic branch exchange and other resources can be flexibly assigned to each user. And when the log function is employed, a user who has illegally accessed a system can be quickly detected and the observation of traffic can be performed.

According to the voice network access system of the present invention, first, an authentication system that is designed to handle data network accesses can also be adapted for use with a voice network merely by adding a peripheral device, without either the authentication system and the private automatic branch exchange being changed. Therefore, maximum system security can be provided with only a minimum investment.

Furthermore, the following features, which can not be provided by a conventional private automatic branch exchange, can be obtained by using the authentication system.

First, multiple authorized users can be registered.

Second, since a disposable password (a one-time password) is used, passwords need not be stored, as in a conventional case. In addition, detailed restrictions involving the use of a day of the week or a date can be provided and illegal access can be prevented, and satisfactory system security can be attained for a voice network as well as for a data network.

Third, the management of passwords is easy. For while conventionally a password must be changed at the terminal of an private automatic branch exchange by a manager, in this embodiment a password can be changed by a password user.

What is claimed is:

1. A voice network access system that provides the same security as that afforded by a data network, the voice network access system comprising:
   a private automatic branch exchange; and
   a one-time password system, which is used as an access authentication system, and which is applied for a voice network that is constituted by said private automatic branch exchange,
   wherein specifications for said private automatic branch exchange are that exchange of sender number information that is received across a public network is enabled, and wherein said private automatic branch exchange includes:
   an external interface;
   a computer telephony server that is connected via said external interface; and
   a voice response device connected by a line circuit, and wherein said private automatic branch exchange calls said voice response device upon receiving a call from a public network switchboard subscriber, while at the same time transmitting said sender number information to said computer telephony server.

2. A voice network access system according to claim 1, wherein upon receiving said sender number information said computer telephony server obtains a pertinent user name by searching a conversion table for sender number information and users' names, which are prepared in advance in said computer telephony server.

3. A voice network access system according to claim 2, wherein said voice network access system further comprises an authentication system server that, to perform a personal authentication process, is connected to said external interface to receive a user's name from said computer telephony server.

4. A voice network access system according to claim 3, wherein said authentication system server instructs said voice response device to send a response, and said voice response device forms a loop for said line circuit.

5. A voice network access system according to claim 4, wherein said voice response device prepares a numerical reception circuit; wherein said voice response device receives a password dialed in by said public network subscriber and transmits said password to said authentication system server; and wherein said authentication system server examines said password and returns the result to said voice response device.

6. A voice network access system according to claim 5, wherein said voice response device uses tones or a display to relay to said public network subscriber said result provided by said examination of said password, and wherein said public network subscriber is granted access to said private automatic branch exchange to the extent that is authorized when, as a result of said examination, said password has been verified.

7. A voice network access system according to claim 6, wherein said authentication system server employs a power authentication function and a log function; wherein said authentication system server, by using said power authentication function, is capable of flexibly assigning, for each user, said function of said private automatic branch exchange and other resources; and wherein said authentication system server, by using said log function, is capable of quickly detecting a user who has illegally accessed a system and of observing traffic.

8. A voice network access system according to claim 4, wherein said authentication system server employs a power authentication function and a log function; wherein said authentication system server, by using said power authentication function, is capable of flexibly assigning, for each user, said function of said private automatic branch exchanger and other resources; and wherein said authentication system server, by using said log function, is capable of quickly detecting a user who has illegally accessed a system and of observing traffic.

9. A voice network access system according to claim 5, wherein said authentication system server employs a power authentication function and a log function; wherein said authentication system server, by using said power authentication function, is capable of flexibly assigning, for each user, said function of said private automatic branch exchanger and other resources; and wherein said authentication system server, by using said log function, is capable of quickly detecting a user who has illegally accessed a system and of observing traffic.

10. A voice network access system according to claim 6, wherein said authentication system server employs a power authentication function and a log function; wherein said authentication system server, by using said power authentication function, is capable of flexibly assigning, for each user, said function of said private automatic branch exchanger and other resources; and wherein said authentication system server, by using said log function, is capable of quickly detecting a user who has illegally accessed a system and of observing traffic.

\* \* \* \* \*